Oct. 7, 1952

D. E. HARRIS 2,612,907

VALVE CONSTRUCTION

Filed Dec. 19, 1950

INVENTOR.
Dwight E. Harris
BY
Kenyon & Kenyon
ATTORNEYS

Patented Oct. 7, 1952

2,612,907

UNITED STATES PATENT OFFICE 2,612,907

VALVE CONSTRUCTION

Dwight E. Harris, Stamford, Conn., assignor to The Skinner Chuck Company, Norwalk, Conn., a corporation of Connecticut Application December 19, 1950, Serial No. 201,620

2 Claims. (Cl. 137—719)

It is the general object of the present invention to provide a three-way valve of simple construction, low cost, high efficiency, long life and compact structure.

Figure 1:
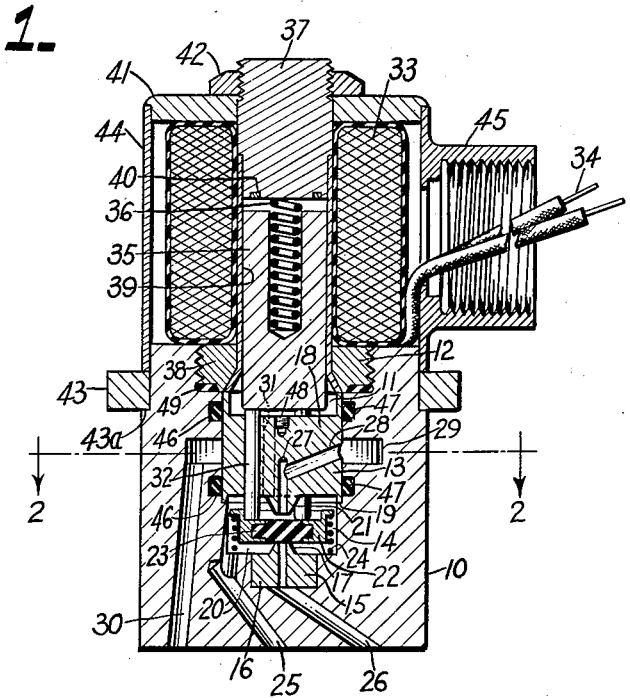
Figure 2:
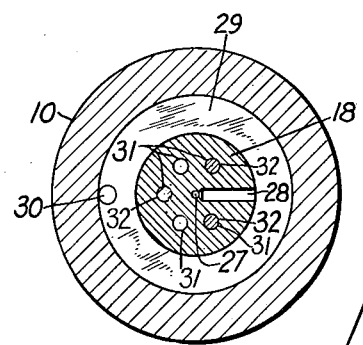

The full nature of the invention, together with all of its objects and advantages, will best be understood by reference to the following description of one illustrative embodiment thereof which is shown graphically in the annexed drawing in which:

The Fig. 1 is a cross sectional view axially through a valve of generally cylindrical configuration;

While the Fig. 2 is a cross sectional view, as in a radial plane, such as along the line 2—2 of the Fig. 1.

Referring to the Fig. 1, the principal operating elements of the valve are positioned in or on a base 10 which is preferably of magnetizable metal and which may be considered as having a generally cylindrical configuration, the Fig. 1 being viewed as though taken along a plane through the axis of the cylindrical configuration. To receive the various operating elements, there is formed in the base 10 and coaxially with its axis, a cylindrical recess 11 having levels or recess sections 12, 13, 14 and 15 of different diameters for the reception of the valve elements of different diameters hereinafter indicated. Within the section 15, there is positioned a metallic cylindrical member 16 having an axial channel therethrough terminating in a first valve seat 17. Within the section 13, there is positioned a metallic block 18 which snugly fits the walls of the section 13 of recess 11. The end surfaces of block 18 are recessed as shown. It will be noted that the block 18 rests on an annular shelf 19 between the recess sections 13 and 14 and by that means it is so spaced from the bottom end wall of the recess 11, i. e., from the wall surrounding valve seat 17, as to define a cylindrical valve chamber 20 between the lower end wall of the block 18 and the lower end wall of the recess 11, i. e., the lower end wall of recess section 14. In the lower end wall of the block 18 there is formed a second valve seat 21 which is the termination of a conduit to be described below.

Within the valve chamber 20, there is mounted for reciprocatory movement a disc-like valve head 22 which may be caused selectably to engage either the valve seat 17 or the valve seat 21 while disengaging the other and which is provided with a resilient central core-like portion 23 of rubber or like resilient material to serve as the sealing means for the ports of valve seats 17 and 21 when the valve head is in engagement with either of those seats. The valve head 22 is mounted on a suitable resilient means such as a spiral spring 24 which is in engagement with the lower end wall of the recess section 14 and with the annular collar or flange shown on the upper periphery of the valve head 22. This spring means is arranged to bias the valve head toward one or the other of the valve seats 17 and 21 depending upon the way in which the valve is operated. For purposes of illustration the spring may be considered as under compression so as to bias the valve head toward engagement with second seat 21.

It will be observed that the structure thus far described includes three functioning conduits as follows: A first conduit 25 communicates with the outside of the base 10 and with the valve chamber 20. A second conduit 26 communicates similarly with the outside of the base 10 and with the valve chamber 20, but through the valve seat 17 so that the conduit 26 may be blocked when the valve head 22 engages the seat 17. A third conduit is defined by both the base 10 and the block 18 as follows. Within the block 18 are contiguous conduit sections 27 and 28, the lower end of conduit 27 terminating in the port of the valve seat 21. The conduit 28 is generally radial (conduit 27 axial) and opens into the cylindrical surface of the block 18 at such a position that it may communicate with an annular chamber or conduit section 29 in the nature of an annular recess in the side walls of the recess section 13. A further conduit section 30 communicates with the outside of the base 10 and the conduit section 29. It will be understood therefore that the sections 27, 28, 29 and 30 constitute a continuous conduit between the valve seat 21 and the outside of the base 10 and that this continuous conduit may be blocked by engagement of head 22 with seat 21.

As already indicated, the valve head 22 is biased toward one or the other of the valve seats 17 and 21. In order that it may be moved against this biasing force to cause it to engage the other valve seat, the following means are provided. Axially slidable in the cylindrical holes 31 (five shown in Fig. 2) extending between the end faces of block 18 are one or more cylindrical connecting rods 32 (three shown) which may engage the valve head 22 for purposes of moving it against the biasing force of the spring 24. These rods may be actuated by any suitable means, preferably the spring 36 to be described.

For governing the movement of the rods 32 and head 22 by springs 24 and 36, there is provided an electromagnet shown as comprising a coil 33 energizable by any suitable source of current (not shown) through the terminal leads 34. Within the coil 33, is provided a magnetic plunger 35 normally biased downwardly by a spring 36 which is under compression between the plunger 35 and the fixed magnetic plug 37. It may be considered that the plunger 35 normally presses downwardly on the connecting rods 32 to bias the valve head 22 into contact with the lower valve seat 17. To that end, of course, the spring 36 must be such that it is stronger than the spiral spring 24 in order to overcome the upward biasing force of the latter.

The structure of the electromagnet is positioned on and affixed to the base 10 as follows. Into the upper recess section 12 there is threaded a bushing 38 of magnetic material to which there has previously been affixed the nonmagnetic sleeve 39 with the plug 37 in its upper end. The plug 37 preferably includes the shading ring 40 so that the valve may be operated by alternating current if desired. It will thus be seen that the bushing 38, the sleeve 39 and the plug 37 may be welded together as a sealed unit for assembly of the valve. A top plate 41 of magnetic material surrounds plug 37 and is held thereon by the nut 42. An annular collar 43 resting on a shelf 43A on base 10 and a cylindrical coil casing 44 of magnetic material resting on collar 43 are held between the plate 41 and the base 10 by nut 42 and bushing 38. A suitable inlet housing 45 for the leads 34 may be provided in the casing 44.

To facilitate the assembly of the block 18 within the recess 11, there are provided two annular recesses 46 in the wall of the recess section 13 and into each of these there is introduced a ring 47 of rubber or like resilient material and preferably having a circular cross section. When the block 18 is introduced into the recess section 13, it may be pushed downwardly to the position shown in Fig. 1 in which case the rings 47 will facilitate the insertion and also serve to seal the juncture between the walls of the recess 11 and the walls of the block 18. In the upper surface of the block 18 there may be provided a threaded hole 48 into which a suitable threaded tool may be inserted to facilitate the removal of the block 18 when disassembling the valve.

The valve structure thus shown may be quickly and easily assembled in the following manner. Starting with the base 10, the member 16 is inserted, the valve head 22 and its spring 24 are added, thereafter the block 18 is pushed into the recess section 13 with the conduit section 28 in alignment with the conduit section 29, and the rods 32 inserted into the proper holes 31. Thereafter the sealed welded unit comprising the bushing 38, the sleeve 39 and the plug 37, with the plunger 35 and spring 36 therein, is positioned on top of the block with the sleeve 39 resting on the upper edge of the block as shown and the bushing 38 screwed firmly into the base 10 with a suitable sealing washer 49 interposed. Thereafter the casing 44 is added with the collar 43; the plate 41 is slipped on and the whole rigidly secured together by the nut 43 which because of the welding of the sleeve 39 to the plug 37 and to the bushing 38 permits the plate 41 and the casing 44 to be held firmly between the nut 42 and the collar 43.

As an illustrative use of the valve it might be considered that the conduit 26 is a "normally closed" port to which a source of fluid pressure is supplied. The conduit 25 may be considered as a "common port" to which a suitable fluid power driven means is connected such as a servomotor or hydraulic piston arrangement. The conduit 30 may be considered a "normally open" port for the exhaust of the fluid from the "common port." It will be understood then that upon energization of the electromagnet the plunger 35 will be pulled upward to permit the springs 24 and 36 to raise valve head 22 to open the seat 17 and block the seat 21. Thereupon fluid under pressure may flow through the conduit 26 through the valve seat 17 and chamber 20 and into the conduit 25 to energize the servomotor or hydraulic piston or whatever equivalent means is being operated. When the electromagnet is deenergized, the spring 36 will push the plunger 35 and the connecting rods 32 downward to push in turn the valve head 22 against spring 24 to close the valve seat 17, thus opening the valve seat 21 while blocking the valve seat 17. Thereupon the fluid under pressure in the servo mechanism or the like may flow back through the conduit 25 and chamber 20 and thence through the conduit comprising conduit sections 27, 28, 29 and 30 to an exhaust.

In this arrangement the valve is considered as "normally closed." It will be appreciated that the valve may also be operated as a "normally open" valve. This may be accomplished by interchanging the attachments to the conduits 26 and 30, i. e., by making the conduit 30 the port to which the source of fluid under pressure is attached and by using the conduit 26 as the exhaust. A re-adjustment of the spring pressures may also be necessary. In that case, upon energization of the electromagnet, the supply of fluid under pressure to the conduit 25 ceases and the exhaust through conduit 26 is permitted to take place. It is to be understood that other modifications may be made. For example, if it be desired that the electromagnet operates such that its plunger moves downwardly upon energization of the coil, suitable rearrangements of the bias directions of the springs and their attachments to the various parts may be made.

What is claimed is:

1. A valve mechanism comprising a base having a cylindrical recess terminating in one surface thereof and having sections of different diameter such that an annular shelf is defined in the wall of the recess, a cylindrical block snugly fitting the cylindrical walls of said recess and resting on the shelf so that a cylindrical valve chamber is defined between the bottom walls of said recess and block, annular recesses in the wall of the cylindrical recess and resilient sealing rings in the annular recesses sealing the juncture of the cylindrical recess and block, a first conduit in said base between the outside of said base and said valve chamber, a first valve seat in the bottom of said recess, a second conduit in said base between the outside of said base and said valve chamber through said first valve seat, a second valve seat in the lower wall of said block, an annular recess chamber in the wall of said cylindrical recess and channels in said block and base communicating with said annular recess chamber, said annular recess chamber and channels defining a third conduit between said second valve seat and the outside of said base, a valve head in said valve chamber movable axially thereof so as to engage selectably one of said valve seats while disengaging the other, spring means biasing said valve head toward engagement with one of said valve seats, and means for moving said valve head toward engagement with the other of said seats against the biasing force of said biasing means comprising slidable connecting rod means extending through and between the end faces of said block and contacting said valve head—all whereby said valve head may be selectably engaged with said first valve seat while disengaging said second valve seat to permit fluid flow between said first and third conduit through said valve chamber and with said second valve seat while disengaging said first valve seat to permit fluid flow between said first and second conduits through said valve chamber.

2. A valve mechanism comprising a base having a cylindrical recess terminating in one surface thereof and having sections of different diameter decreasing in the inward direction such that an annular shelf is defined in the wall of the recess, a cylindrical slidably removable block snugly fitting the cylindrical walls of said recess and resting on the shelf so that a cylindrical valve chamber is defined between the bottom walls of said recess and block, annular recesses in the wall of the cylindrical recess adjacent the block and resilient sealing rings in the annular recesses sealing the juncture of the cylindrical recess and block, a first conduit in said base between the outside of said base and said valve chamber, a first valve seat in the bottom of said recess, a second conduit in said base between the outside of said base and said valve chamber through said first valve seat, a second valve seat in the lower wall of said block, an annular recess chamber in the wall of said cylindrical recess adjacent the block and channels in said block and base communicating with said annular recess chamber, said annular recess chamber and channels defining a third conduit between said second valve seat and the outside of said base, a valve head in said valve chamber movable axially thereof so as to engage selectably one of said valve seats while disengaging the other, spring means biasing said valve head toward engagement with one of said valve seats, and means for moving said valve head toward engagement with the other of said seats against the biasing force of said biasing means comprising slidable connecting rod means extending through and between the end faces of said block and contacting said valve head, and an electromagnet on the opposite side of said block from said valve chamber for actuating the connecting rod means—all whereby said valve head may be selectably engaged with said first valve seat while disengaging said second valve seat to permit fluid flow between said first and third conduit through said valve chamber and with said second valve seat while disengaging said first valve seat to permit fluid flow between said first and second conduits through said valve chamber.

DWIGHT E. HARRIS.

REFERENCES CITED

The following references are of record in the file of this patent:

UNITED STATES PATENTS

| Number | Name | Date |
|---|---|---|
| 1,498,504 | Benit | June 17, 1924 |
| 1,533,128 | Meyers | Apr. 14, 1925 |
| 1,769,910 | Ponsonly | July 1, 1930 |
| 1,786,234 | Forman | Dec. 23, 1930 |

FOREIGN PATENTS

| Number | Country | Date |
|---|---|---|
| 790,637 | France | Nov. 25, 1935 |